UNITED STATES PATENT OFFICE.

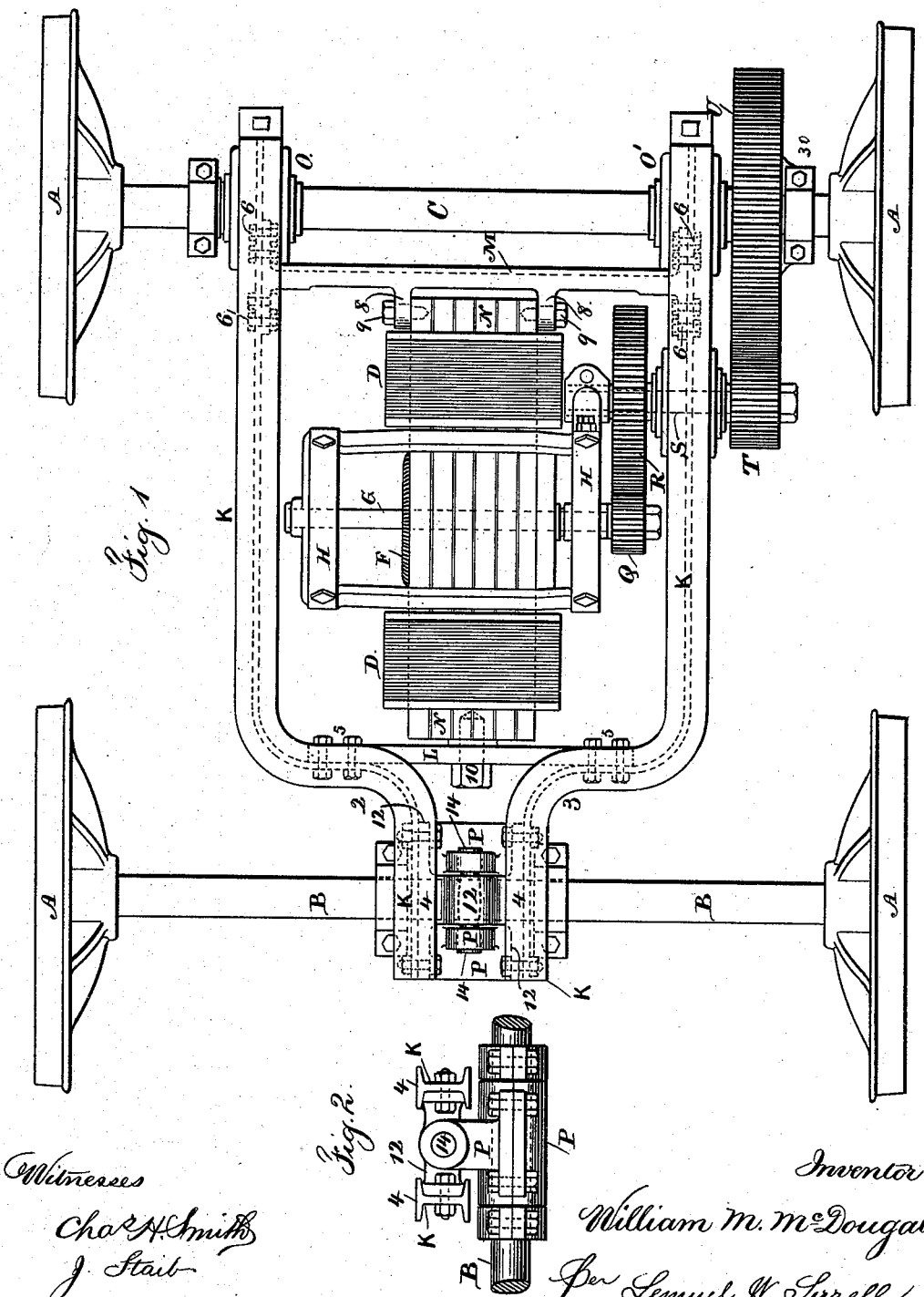

WILLIAM M. McDOUGALL, OF EAST ORANGE, NEW JERSEY.

ELECTRIC MOTOR FOR RAILWAY-CARS.

SPECIFICATION forming part of Letters Patent No. 412,528, dated October 8, 1889.

Application filed May 23, 1889. Serial No. 311,813. (No model.)

*To all whom it may concern:*

Be it known that I, WILLIAM M. McDOUGALL, of East Orange, in the county of Essex and State of New Jersey, have invented an Improvement in Electric Motors for Railway-Cars, of which the following is a specification.

Electric motors have heretofore been supported by a frame resting at its ends upon the car-wheel axles. This frame has been quadrangular and provided with four boxes or bearings—two upon each axle. In consequence of the inequalities of the railway-track over which the car passes the wheel-axles are not always parallel with each other or in the same horizontal plane. The consequence is that the electric-motor frame is more or less twisted, distorted, or loosened, and the electric motor does not run freely and perfectly.

The object of my improvement is to support the electric motor in a frame in the most firm and reliable manner, so that the frame itself may not become twisted or out of shape, and the frame is so supported by the car-axles that the axles and wheels are free to accommodate inequalities in the track without either straining the electric-motor frame or disturbing in any manner the proper relative positions of the parts of such motor.

In the drawings, Figure 1 is a plan view of the motor and its frame and the car axles and wheels, and Fig. 2 is an elevation of the central connection at one end of the frame.

The car-wheels A A are connected to the respective axles B and C, as usual. The electric motor is to be of any desired character. At D the field-magnets are represented and the armature at F, and the shaft G thereof is in bearings or frames H. The main frame supporting the electric motor is made of angle-irons, preferably of I-shaped bars K K, which are bent at 2 and 3, so as to be brought together or nearly together in the parts 4, and there is a cross-bar L introduced at one side of the bars K and bolted firmly thereto, as at 5, and a second cross-bar M between the two parallel portions of the bars K, the ends of such cross-bar M being T-shaped and bolted to the bars K, as at 6, and there are ears 8 on the cross-bar M, between which the field-magnet frame N is received and firmly secured by the bolts 9, and at the opposite side of the electric motor there is a screw-bolt 10, passing through the cross-bar L into the frame N, so that such frame N and the electric motor is held very rigidly, but at the same time, should there be any twisting action upon the bars K and main frame, it will not be communicated to any part of the motor, because the cross-bar L might turn slightly upon the bolt 10.

At the ends of the bars K there are journal boxes or bearings O O', resting upon and surrounding the axle C. These journal boxes or bearings may be of any suitable character, so that the shaft or axle C turns within said bearings, and there are collars upon the axle, so that the frame will be retained in the proper position, but the axle is free to turn.

The portions 4 of the bars K are parallel to each other and sufficiently near together for being connected to the single central bearing P upon the axle B. This single central bearing P may be of any desired character, and it is to be sufficiently loose to allow the axle B to turn either horizontally or vertically in its relation to the main frame of the machine, so that while the main frame of the machine remains in a given position in relation to the axle C in traveling upon the track the axle B may be out of line therewith, either vertically or horizontally, without twisting or distorting the main frame of the machine.

I have shown the ends 4 of the frame-bars K as sufficiently far apart for the single central bearing P to pass in between the ends 4 of the bars K, there being a jaw at the upper end of the central bearings P, receiving the cross-bar or block 12 between the straight portions 4 of the bars K, and there is a bolt 14, passing through the jaws and through the central bar or block 12, upon which the parts may turn, as the axle B may change its position in relation to the axle C.

It is preferable to make use of a pinion Q on the end of the armature-shaft, gearing into a wheel R upon the counter-shaft S, supported in bearings in the respective frames, and there is a pinion T at the outer end of the shaft S, gearing into the wheel U upon the axle C. This wheel U is preferably divided, so that the axle is clamped when the halves of the wheel are bolted together, as shown at the hub flanges and bolts 30, and the respective collars upon the axles are preferably made in two parts bolted together, so that they can be applied to such axles without removing either of the wheels.

The commutator and its brushes are not shown in the drawings. They may be of any usual character, and form no part of my present invention.

I claim as my invention—

1. The combination, with the two pairs of car-wheels and their axles and an electric motor, of a frame formed of two bars K K, bent at 2 3, so as to come together, or nearly so, the electric motor being secured between the said bars, and two bearings O on one axle at one end of the frame and one bearing on the other axle and at the other end of the frame, substantially as specified.

2. The combination, with an electric motor having a frame for supporting the field-magnets and the armature-shaft, of the main frame composed of bars K and cross-bars L M, and the bolts 9 for connecting the frame of the electric motor at one end to the cross-bar M, and the bolt 10 for connecting the frame of the electric motor to the cross-bar L at the other end, substantially as set forth.

3. The frame for receiving the electric motor and connecting the same to the axles of the railway-car, consisting of the bars K, with the bends 2 and 3 and the straight portions 4, the cross-bars L and M, bolted to the bars K, bearings O O' for connecting the frame K to the axle C, and single central bearing P for connecting the straight portions 4 of the frame K to the axle B, substantially as set forth.

4. The combination, with an electric car-motor and its frame, of the main frame K, composed of bars bent at 2 and 3, and having parallel portions 4, the cross-bars L M, to which the electric-motor frame is bolted, the bearings O O', connecting the frame K to the axle C, and a single central bearing P, connecting the frame K to the axle B, substantially as set forth.

5. The combination, with the frame K and car-axles B and C, of the bearings O O', connecting the frame K to the axle C, the single central bearing P, connecting such frame to the axle B, the pinions Q and T, and gears R and U for connecting the armature-shaft to the axle C, and the counter-shaft S, supported by the frame K, and carrying the wheel R and pinion T, substantially as specified.

6. The combination, with the electric motor and the car-axles B and C, of the frame composed of the bars K, having bearings O O' at their ends for the axle C, and the single bearing P upon the axle B, and a yielding connection between the central bearing and the frame to allow the axle B to change its position in relation to the axle C without straining or injuring the frame of the electric motor, substantially as set forth.

Signed by me this 20th day of May, 1889.

WILLIAM M. McDOUGALL.

Witnesses:
GEO. T. PINCKNEY,
WILLIAM G. MOTT.